US012464176B2

(12) United States Patent
Fieau et al.

(10) Patent No.: US 12,464,176 B2
(45) Date of Patent: Nov. 4, 2025

(54) CONTROLLING THE TRANSMISSION OF AT LEAST ONE ITEM OF CONTENT FROM A PIECE OF PROVIDER EQUIPMENT TO AN INGEST NODE

(71) Applicant: Orange, Issy-les-Moulineaux (FR)

(72) Inventors: Frédéric Fieau, Chatillon (FR); Gaël Fromentoux, Chatillon (FR); Emile Stephan, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 104 days.

(21) Appl. No.: 18/260,021

(22) PCT Filed: Dec. 16, 2021

(86) PCT No.: PCT/FR2021/052358
§ 371 (c)(1),
(2) Date: Jun. 29, 2023

(87) PCT Pub. No.: WO2022/144512
PCT Pub. Date: Jul. 7, 2022

(65) Prior Publication Data
US 2024/0015344 A1   Jan. 11, 2024

(30) Foreign Application Priority Data
Dec. 30, 2020  (FR) ..................................... 2014280

(51) Int. Cl.
*H04N 21/24*  (2011.01)
(52) U.S. Cl.
CPC ..... *H04N 21/2407* (2013.01); *H04N 21/2408* (2013.01)

(58) Field of Classification Search
None
See application file for complete search history.

(56) References Cited

U.S. PATENT DOCUMENTS

| 2016/0057457 A1 | 2/2016 | Clements et al. |
| 2019/0173935 A1 | 6/2019 | Lohmar et al. |

(Continued)

OTHER PUBLICATIONS

L Peterson et al., "Framework for Content Distribution Network Interconnection (CDNI)", Internet Engineering Task Force (IETF) Request for Comments: 7336, Aug. 2014.

(Continued)

*Primary Examiner* — Omar S Parra
(74) *Attorney, Agent, or Firm* — Knobbe, Martens, Olson & Bear, LLP

(57) ABSTRACT

A solution for controlling the transmission of at least one near-live item of content from a user equipment to an ingest node of a content delivery network. Such a solution comprises the following: measuring a value of at least one actual telemetry datum relating to the transmission of at least one constituent data packet of the item of content; comparing the value of at least one actual telemetry datum with a value of at least one expected telemetry relating to the transmission of the at least one constituent data packet of the item of content; when the value of the actual telemetry datum and the value of the expected telemetry datum correspond, triggering, to the benefit of the content delivery network, a reward relating to the transmission of the content.

16 Claims, 3 Drawing Sheets

(56) References Cited

U.S. PATENT DOCUMENTS

2019/0320004 A1* 10/2019 Allen .................. H04L 65/80
2020/0322663 A1 10/2020 Vaderna et al.

OTHER PUBLICATIONS

Barman Nabajeet et al. "Blockchain for Video Streaming: Opportunities, Challenges, and Open Issues", Computer, IEEE Computer Society, USA, vol. 53, No. 7, Jul. 1, 2020, pp. 45-56.
F. Brockners et al. "Proof of Transit draft-ietf-sfc-proof-of-transit-07" Network Working Group, Oct. 25, 2020.
International Search Report for International Application No. PCT/FR2021/052358 dated Feb. 21, 2022.
Written Opinion of the International Searching Authority for International Application No. PCT/FR2021/052358 dated Feb. 21, 2022.

* cited by examiner

CONTROLLING THE TRANSMISSION OF AT LEAST ONE ITEM OF CONTENT FROM A PIECE OF PROVIDER EQUIPMENT TO AN INGEST NODE

CROSS-REFERENCE TO RELATED APPLICATIONS

This application is filed under 35 U.S.C. § 371 as the U.S. National phase of application No. PCT/FR2021/052358 entitled "CONTROLLING THE TRANSMISSION OF AT LEAST ONE ITEM OF CONTENT FROM A PROVIDER EQUIPMENT TO AN INGEST NODE" and filed Dec. 16, 2021, and which claims priority to FR 2014280 filed Dec. 30, 2020, each of which is incorporated by reference in its entirety.

BACKGROUND

Field

The field of the development is that of "near-live" data transfers, i.e. transfers with a very short delay, in the order of a few seconds to about ten seconds, between the acquisition of the content and the viewing thereof on third-party equipment, or that of streaming content. More specifically, the development relates to the field of transferring content from a piece of access equipment to an ingest node of a content delivery network with a view to delivering the content thus transferred.

Description of the Related Art

With the recent development of social networks, more and more people using terminals, such as mobile phones or any other mobile terminal, can transmit content to an ingest point of a content delivery network (CDN) in order to deliver it to the largest possible audience. These terminals are referred to as content provider terminals and can be user terminals typically used for receiving, viewing and listening to content in other circumstances.

Similarly, with the increase in the speed of communication networks, thanks in particular to the arrival of networks compliant with 4th generation radio communication standards and the implementation of networks compliant with 5th generation radio communication standards, an audiovisual stream can be provided, for example by means of video cameras used to cover a live news or sports event, to an ingest node of a content delivery network CDN through an uplink such that this audiovisual stream is delivered by the content delivery network CDN to a set of user terminals. A plurality of end users of these user terminals are thus able to view the audiovisual stream without it being transmitted directly by the camera acquiring the audiovisual stream to each of the user terminals of the end users.

In known content distribution architectures, content servers, managed by a content provider, transmit content to ingest nodes, or servers CDNs belonging to a content delivery network CDN, in accordance with pre-established content provision and delivery contracts which include in particular information on the data transmission rate, transmission quality parameters and information on the volume of data to be transmitted by the content provider to the ingest node. Such architectures, which are based on the existence of a signed contract between the content provider and an operator of a content delivery network CDN, are not adapted to the dynamic delivery of content by terminals whose users have not, in principle, signed content provision and delivery contracts with the operator of a content delivery network CDN to which the ingest node belongs.

In these examples, the piece of equipment providing the content, i.e. the camera or the mobile terminal, as the content source, is configured to transmit encoded data with the highest resolution that this piece of provider equipment is able to transmit.

One drawback of these uplink content transmission techniques is that the piece of provider equipment does not always know the available upstream rate of the uplink established with the ingest node, i.e. the node in charge of recording the content elements (packets, pictures, GoP, chunk, etc.) transmitted by the piece of provider equipment and of delivering them to user terminals or to one or more other ingest or delivery nodes of the content delivery network CDN. Thus, the piece of provider equipment can find itself in a situation where it is delivering content at a lower rate and quality than the uplink could actually handle. The piece of provider equipment could also find itself in a situation where it is transmitting content at too high a rate, which can cause data loss during transmission. Finally, the piece of provider equipment can find itself in a situation where it is providing content that has freezing or blockiness issues and degraded sound.

This lack of knowledge of the uplink characteristics by the piece of provider equipment can negatively impact the quality of experience of the users to whom the content is delivered by the content delivery network CDN to which the ingest node belongs. More specifically, content is badly ingested by the ingest node, i.e. if errors altering the content have occurred during the transmission thereof through the uplink, this has a direct impact on the delivery thereof because it is the unsatisfactorily ingested content, i.e. the corrupted content, that is delivered over the content delivery network via the ingest node.

The impact of unsatisfactory content ingestion is a major source of harm, particularly for e-commerce sites. More specifically, a product promoted by corrupted content does not meet the expected interest because all those accessing the content associated therewith watch degraded content. This unsatisfactory quality of experience has a negative impact on the number of purchases or sales of the product in question.

There is thus a need for a technique for transferring content from a piece of content provider equipment to an ingest node of a content delivery network with a view to delivering the content thus transferred and that does not have some or all of the aforementioned drawbacks.

SUMMARY

The development addresses this need by proposing a method for controlling the transmission of at least one item of content from a piece of provider equipment to an ingest node of a content delivery network.

Such a method for controlling the transmission of at least one item of content is particular in that it comprises the following steps which are implemented by a piece of control equipment:

measuring a value of at least one actual telemetry datum relating to the transmission of at least one constituent data packet of said item of content, comparing said value of at least one actual telemetry datum with a value of at least one expected telemetry datum relating to the transmission of said at least one constituent data packet of said item of content, when the value of said actual telemetry datum and the value of said expected telemetry datum match, triggering, for an entity managing the content delivery network, compensation for the transmission of said item of content.

If an operator of a content delivery network is looking to obtain compensation, such as payments or services provided on its behalf by the piece of provider equipment, in return for ingesting content over an uplink, it must ensure that the content delivery network that it is operating is capable of meeting the transmission conditions imposed by the user of the provider equipment at the origin of the transmission and in accordance with the type of content to be delivered.

Thus, by placing conditions on compensation intended to be awarded by the user of the piece of provider equipment from which the item of content is transmitted, to the content delivery network, or the manager thereof, in compliance with transmission conditions established by way of expected telemetry data, the user initiating the ingestion of the content is provided with greater certainty as regards the quality of the content that will be delivered by a piece of equipment in the content delivery network since the quality of the transmission is guaranteed.

The proposed solution is dynamic and offers an interesting flexibility of use as it is applied on a case-by-case basis. More specifically, the conditional compensation concerns the transaction of a given item of content and a given piece of provider equipment. In other words, the transmission of a new item of content by the same piece of provider equipment or the transmission of the same item of content by another piece of provider equipment triggers the creation of new conditional compensation associated with new expected telemetry data values.

As the telemetry data are directly related to the quality of transmission of the content, they are the data of choice for determining whether the conditions for triggering the payment transaction are met.

Finally, in such a solution, the compensation can be nuanced. More specifically, if only part of the negotiated transmission conditions are met, the compensation can be allocated, but corresponds to a lesser consideration since the expected service has not been rendered. Thus, for example, if the compensation is an amount to be paid for the service rendered, the amount can be revised downwards since not all of the transmission conditions were met.

In one specific implementation of the method for controlling the quality of the transmission of at least one item of content, this method comprises a prior negotiation step between said piece of control equipment and the piece of provider equipment during which said one value of at least one expected telemetry datum is determined.

During this negotiation step, the content delivery network transmits transmission offers to the piece of provider equipment, such as prices associated with transmission conditions in terms of rate, transmission duration, or certain services that the piece of provider equipment could provide, etc., so that the user of the piece of provider equipment can select an offer that is suitable therefor with regard to the transmission constraints linked to the nature of the content to be transmitted and the location of the piece of provider equipment at the time of transmission. More specifically, the location of the piece of provider equipment, outdoors or indoors for example, can have an impact on the quality of the transmission.

The user can thus be given visibility as regards the transmission conditions for his/her content.

According to a feature of the method for controlling the quality of the transmission of at least one item of content, during the negotiation step, the piece of control equipment and the piece of provider equipment further exchange data on the type of compensation for the awarding of said compensation in exchange for the transmission of said item of content.

Thus, once at least one content packet has been transferred in compliance with at least part of the previously negotiated transmission conditions, the validity of the compensation is established immediately and transparently for the user of the piece of provider equipment. The data exchanged during the negotiation step can be included in the constituent data packets of the content, taking advantage in particular of the numerous padding packets present in QUIC-type streams. The compensation can be cyclic, as described in the document published at https://interledger.org/rfcs/0019-glossary/#cyclic-transaction, in order to avoid repetition and resist packet loss, where cyclic compensation is applied to data packets other than the data packet that carried the compensation data.

The satisfaction of the one or more negotiated transmission conditions triggering the compensation is based on obtaining, by computation from the actual and expected telemetry data, the same preimage, described in the document published at https://interledger.org/rfcs/0019-glossary/#conditional-transfer, as the preimage obtained by hashing the one or more negotiated transmission conditions.

For example, it can involve setting up a proof of transit (PoT) through intermediate nodes as specified in the document referenced https://tools.ietf.org/html/draft-ietf-sfc-proof-of-transit-01 #section-3.2.1 further comprising the insertion, into data packets, of information relating to compensation whose triggering is conditional on the verification of a proof of transit triggering the validity of the compensation. In this precise case (PoT), a simple verification condition is the receipt, by the ingest node, of the same preimage of a constant of a Lagrange polynomial configured during the negotiation step. The size of the preimage can be reduced in this case.

According to another feature of the method for controlling the quality of the transmission of at least one item of content, said at least one telemetry datum belongs to a group comprising, inter alia:
- a duration of transit between the piece of provider equipment and the ingest node of a constituent data packet of the item of content,
- an identifier of at least one intermediate node contributing to routing a constituent data packet of the item of content between the piece of provider equipment and the ingest node, the identifier advantageously being able to contain the identifier of an operator managing the intermediate node,
- a transit time of a constituent data packet of the item of content through an intermediate node, corresponding to the time when the intermediate node receives, processes or transmits the data packet,
- a delay for the crossing of an intermediate node 13-15 by a constituent data packet of the item of content,
- a delay for the processing of a constituent data packet of the item of content by an intermediate node 13-15,
- a quality of service, representative of the prioritization of the constituent data packet of the item of content, which quality of service can, according to one example, be represented by a qualitative indication of the processing of the packet during the routing thereof to the ingest node, a cryptographic key created from the set of transmission conditions, the receipt without loss or retransmission of a group of constituent data packets of the item of content, a combination of the individual telemetry data of the group.

According to a feature of the method for controlling the quality of the transmission of at least one item of content, when said telemetry datum is a transit duration of the at least one constituent data packet of said item of content, said comparison step consists of determining a wandering time, and when a value of the wandering time is lower than a threshold negotiated between the piece of provider equipment and the piece of control equipment, the actual transit duration and the expected transit duration match.

According to another feature of the method for controlling the quality of the transmission of at least one item of content, when said telemetry datum is a transmission time for the constituent data packet of said item of content, said comparison step consists of determining a difference between an actual transmission time for said at least one constituent data packet of said item of content, and an expected transmission time for said at least one data packet, and when the difference is lower than a threshold negotiated between the piece of provider equipment and the piece of control equipment, the actual transmission time and the expected transmission time match.

According to a feature of the method for controlling the quality of the transmission of at least one item of content, when said telemetry datum is an identifier of at least one intermediate node through which said constituent data packet of said item of content must transit during the transmission thereof to the ingest node, said comparison step consists of verifying the presence of at least one datum inserted into said item of content by said at least one intermediate node and containing the identifier of said at least one intermediate node.

The development further relates to a method for transmitting at least one item of content from a piece of user equipment to an ingest node of a content delivery network.

Such a method for transmitting at least one item of content comprises the following steps which are implemented by said piece of user equipment:

negotiating between said piece of provider equipment and a piece of equipment for controlling the transmission of said item of content during which a value of at least one expected telemetry datum is determined, said value of at least one expected telemetry datum allowing the piece of control equipment to control the transmission of said item of content, generating at least one data stream containing at least one data packet containing constituent data of said item of content and/or data containing said value of at least one expected telemetry datum, transmitting said data stream thus generated to said ingest node.

By generating a data stream containing both constituent data packets of said item of content and data packets relating to an expected telemetry datum intended to be used to verify conditions for triggering compensation for the transmission of the content to an ingest node of a content delivery network, the telemetry datum in question is guaranteed to follow the same path as the content to which it refers during the transmission thereof.

Thus, the verifications carried out using this expected telemetry datum to trigger compensation are reliable.

According to a feature of the method for transmitting at least one item of content, during the negotiation step, the piece of provider equipment and the piece of control equipment further exchange data on the type of compensation for the awarding, to the content delivery network, of compensation in exchange for the transmission of said at least one item of content.

According to another feature of the method for transmitting at least one item of content, said at least one telemetry datum belongs to a group comprising, inter alia:

a duration of transit between the piece of provider equipment and the ingest node of a constituent data packet of the item of content, an identifier of at least one intermediate node contributing to routing a constituent data packet of the item of content between the piece of provider equipment and the ingest node, the identifier advantageously being able to contain the identifier of an operator managing the intermediate node, a transit time of a constituent data packet of the item of content through an intermediate node, corresponding to the time when the intermediate node receives, processes or transmits the data packet, a delay for the crossing of an intermediate node 13-15 by a constituent data packet of the item of content, a delay for the processing of a constituent data packet of the item of content by an intermediate node 13-15, a quality of service, representative of the prioritization of the constituent data packet of the item of content, which quality of service can, according to one example, be represented by a qualitative indication of the processing of the packet during the routing thereof to the ingest node, a cryptographic key created from the set of transmission conditions, the receipt without loss or retransmission of a group of constituent data packets of the item of content, a combination of the individual telemetry data of the group.

In one specific embodiment of the method for transmitting at least one item of content, the piece of provider equipment generates a first data stream containing the constituent data packets of said item of content and at least a second data stream containing the data packets carrying said value of at least one expected telemetry datum, the first and second data streams being multiplexed into a single data stream transmitted to the ingest node.

According to a feature of the method for transmitting at least one item of content, the data packets carrying said value of at least one expected telemetry datum are transmitted in the form of signal data packets.

The development further relates to a piece of equipment for controlling the transmission of at least one item of content from a piece of user equipment to an ingest node of a content delivery network.

Such a piece of control equipment comprises means for:

measuring a value of at least one actual telemetry datum relating to the transmission of at least one constituent data packet of said item of content, comparing said value of at least one actual telemetry datum with a value of at least one expected telemetry datum relating to the transmission of said at least one constituent data packet of said item of content, when the value of said actual telemetry datum and the value of said expected telemetry datum correspond, triggering, to the benefit of the content delivery network, compensation for the transmission of said item of content.

The development further relates to a piece of equipment capable of transmitting at least one item of content to an ingest node of a content delivery network.

Such a piece of equipment is particular in that it comprises means for:

negotiating with a piece of equipment for controlling the transmission of said item of content during which a value of at least one expected telemetry datum is determined, said value of at least one expected telemetry datum allowing the piece of control equipment to control the transmission of said item of content, generating at least one data stream containing at least one data packet containing constituent data of said item of content and/or data containing said value of at least one expected telemetry datum, transmitting said data stream thus generated to said ingest node.

Such a piece of user equipment is, for example, a mobile terminal such as a smartphone or a residential gateway intended to interconnect a set of terminals within a local network, such as a Livebox® router.

Finally, the development relates to computer program products comprising program code instructions for implementing methods as described hereinabove, when they are executed by a processor.

The development further relates to a computer-readable recording medium on which are recorded computer programs comprising program code instructions for executing the steps of the methods according to the development as described hereinabove.

Such a recording medium can be any entity or device capable of storing the programs. For example, the medium can include a storage means, such as a ROM, for example a CD-ROM or a ROM of a microelectronics circuit, or a magnetic storage means, for example a flash disk or a hard disk.

On the other hand, such a recording medium can be a transmittable medium such as an electric or optical signal, which can be carried via an electric or optical cable, by radio waves, or by other means, such that the computer programs contained therein can be executed remotely. The programs according to the development can in particular be downloaded from a network, for example the Internet network.

Alternatively, the recording medium can be an integrated circuit into which the programs are incorporated, the circuit being suitable for executing or for use in the execution of the aforementioned methods of the development.

BRIEF DESCRIPTION OF THE DRAWINGS

Other aims, features and advantages of the development will be better understood upon reading the following description, which is given as a rough guide and in no way as a limited guide, with reference to the accompanying figures, in which.

DETAILED DESCRIPTION OF CERTAIN ILLUSTRATIVE EMBODIMENTS

The general principle of the solution proposes, in order to improve the transmission of a "near-live" item of content, i.e. content with a very short delay, in the order of a few seconds to about ten seconds, between the acquisition of the content and the viewing thereof on third-party equipment, or the streaming of content, from a piece of content provider equipment to an ingest node of a content delivery network, or content ingestion, to condition compensation, such as a payment, for the service rendered, i.e. the ingestion of the content by the ingest node, on compliance with certain transmission conditions. Thus, if the content is not ingested by the ingest node in compliance with the transmission conditions negotiated between a user of the piece of provider equipment and the content delivery network, then the service provision does not generate compensation. Such compensation can be made to the benefit of one or more entities such as an entity for managing the content delivery network CDN, a content provider entity, or an operator of a communication network, etc.

Figure 1:
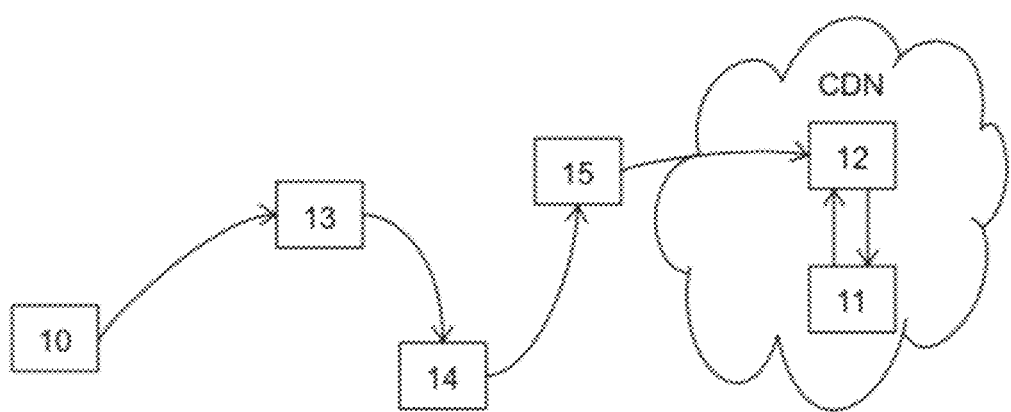
FIG. 1 this figure diagrammatically shows an example of a system wherein the methods of the present development are implemented, FIG. 2 this figure shows the various steps of the methods for controlling the quality of the transmission of at least one item of content and for transmitting at least one item of content, which are the subject matter of the development, FIG. 3 this figure shows a piece of user equipment capable of implementing the various embodiments of the methods for controlling the quality of the transmission of at least one item of content and for transmitting at least one item of content, which are the subject matter of the development, FIG. 4 this figure shows a piece of control equipment capable of implementing the various embodiments of the methods for controlling the quality of the transmission of at least one item of content and for transmitting at least one item of content, which are the subject matter of the development.

FIG. 1 diagrammatically shows an example of a system wherein the methods of the present development are implemented.

The system 1 thus shown comprises at least one piece of user equipment, referred to as the piece of provider equipment 10, such as a smartphone, a camera, or a tablet, etc. Such a piece of provider equipment 10 acquires an item of content, such as a video promoting a product or a sports or cultural event, which the user of the piece of provider equipment 10 is looking to deliver to a large number of people.

For this purpose, the piece of provider equipment 10 transmits the content to an ingest node 11 of a content delivery network CDN. Once the content has been ingested by the ingest node 11, it is prepared, optionally stored in memory or even adapted in a cache server of the content delivery network CDN, and delivered to other pieces of user equipment such as smartphones, set-top boxes, personal computers, or smart TVs, etc.

The content delivery network CDN further comprises a piece of control equipment 12, the operation whereof will be described in more detail hereinbelow. In one embodiment of the present development, the ingest node 11 and the piece of control equipment 12 are comprised in the same piece of equipment belonging to the content delivery network CDN.

Finally, the content is transmitted either through an uplink directly established, i.e. without an intermediate node, between the piece of provider equipment 10 and the control node 12, or, as shown in FIG. 1, through an uplink established between the piece of provider equipment 10 and the control node 12 and comprising a plurality of intermediate nodes 13-15.

The transmission of the content between the piece of provider equipment 10 and the ingest node 11 will now be described in more detail with reference to FIG. 2, which shows the different steps of the methods for controlling the quality of the transmission of at least one item of content and for transmitting at least one item of content, which are the subject matter of the development.

In a step E1, a user, such as an influencer, acquires an item of content, such as a video, by means of the piece of provider equipment 10, which in this example is a smartphone. Such an item of content consists of a plurality of data packets.

The user of the piece of provider equipment 10 is looking to deliver or stream an item of content being acquired to his/her followers. According to one example, the item of content is real-time content. The content must thus be transmitted to an ingest node 11 of a content delivery network CDN so that the item of content can be prepared in view of delivery. The item of content can be assembled with other content prior to delivery. Once the item of content to be delivered has been prepared and optionally recorded in a cache server (not shown in the figures) of the content delivery network CDN, it is delivered by one or more pieces of equipment of the content delivery network CDN to the pieces of equipment of the followers looking to access said item of content.

As the user of the piece of provider equipment 10 is a natural person, he/she does not necessarily have a pre-established content ingest contract with the operator managing the content delivery network CDN specifying the transmission conditions such as, for example, the uplink rate between the piece of provider equipment 10 and the ingest node 11, the latency time, the round trip time (RTT) and the ingest pricing conditions dependent on these transmission conditions, which transmission conditions depend on a location of the piece of provider equipment 10 at the time of content acquisition and ingestion, as opposed to a content provider, which has such contracts for transmitting its content to an ingest node 11 of the content delivery network CDN.

Thus, prior to the transmission of the item of content to the ingest node 11, the piece of provider equipment 10 implements a step E2 of negotiating the transmission conditions for the item of content with a piece of control equipment 12 belonging to the content delivery network CDN depending on the location of the piece of provider equipment 10, in particular by specifying whether the latter is located indoors or outdoors, as this has an impact on the quality of the transmission.

During this negotiation step, transmission conditions established by values of one or more telemetry data items associated with compensation, such as a price offer, are transmitted by the piece of control equipment 12 to the piece of provider equipment 10. The telemetry data belong to a group that includes, inter alia:
- a duration of transit between the piece of provider equipment 10 and the ingest node 11 of a constituent data packet of the item of content,
- an identifier of at least one intermediate node 13-15 routing at least one constituent data packet of the item of content between the piece of provider equipment and the ingest node 11, the identifier advantageously being able to contain the identifier of an operator managing the intermediate node 13-15,
- a transit time of a constituent data packet of the item of content through an intermediate node 13-15, corresponding to the time when the intermediate node 13-15 receives, processes or transmits the data packet,
- a delay for the crossing of an intermediate node 13-15 by a constituent data packet of the item of content,
- a delay for the processing of a constituent data packet of the item of content by an intermediate node 13-15,
- a quality of service, representative of the prioritization of the constituent data packet of the item of content, which quality of service can, according to one example, be represented by a qualitative indication of the processing of the packet during the routing thereof to the ingest node 11,
- the receipt without loss or retransmission of a group of constituent data packets of the item of content,
- a combination of the aforementioned individual telemetry data of the group.

It goes without saying that other telemetry data can be used within the scope of the present development. Thus, another telemetry datum relates to a parameter representative of a quality of experience (also referred to as QoE) of the users of user equipment to which the item of content ingested by the ingest node 11 is delivered.

The user of the piece of provider equipment 10, or a content delivery application previously installed in the piece of provider equipment 10, selects a suitable offer, i.e. he/she selects one or more transmission conditions that correspond to his/her situation, for example the indoor or outdoor location of the piece of provider equipment 10, the nature of the connection of the piece of provider equipment 10 with a communication network, i.e. wired or wireless, Wi-Fi, or Bluetooth network, etc., and to his/her budget. Such transmission conditions are materialized by values of one or more of the telemetry data items described hereinabove and are associated with compensation.

Finally, at the end of step E2, the piece of provider equipment 10 transmits a message MGS1 to the piece of control equipment 12 identifying the selected set of transmission conditions received during the negotiation step.

In a first specific embodiment of the development, the piece of provider equipment 10 and the piece of control equipment 12 also exchange, in step E2, data for the awarding of compensation, such as for example the implementation of a payment transaction, regarding the transmission of the item of content. These data are, for example, bank details of the user of the piece of provider equipment 10 and of an operator of the content delivery network CDN, or a customer identifier for the user of the piece of provider equipment 10 allowing the operator of the content delivery network CDN to charge the amount of the content transmission service on a telephone bill of the user of the piece of provider equipment 10. It goes without saying that other means of carrying out the payment transaction can be considered within the scope of the present solution.

Thus, when the content delivery application installed in the piece of provider equipment 10 is a browser, the content delivery application continuously inserts conditional transactions using so-called "web payment" application programming interfaces or APIs, such as those defined by the W3C or World Wide Web Consortium (https://www.w3.org/TR/payment-request/) and the inserted conditional transactions are transferred in compliance with the "Interledger" protocol (https://interledger.org/rfcs/0003-interledger-protocol/) in ILP-type packets ("InterLedger packets"). The condition related to conditional transactions is, in this case, a cryptographic key created by the content delivery application from the set of transmission conditions selected during the negotiation step E2. In this embodiment, the cryptographic condition is also transmitted in the message MGS1. The transaction will be completed following a verification step E6, described hereinbelow, carried out by the piece of control equipment 12, if, during this verification step, the piece of control equipment 12 obtains an identical or equivalent cryptographic key value. If this is not the case, then the transaction is abandoned.

Other types of compensation can be considered within the scope of the present solution. Thus, according to another example, the piece of provider equipment 10 can, in exchange for the ingestion of the item of content by the ingest node 11, provide connectivity or data storage services, or act as an intermediate node for a service implemented by the operator of the content delivery network CDN to which the ingest node 11 belongs. In such a case, there is no payment transaction as such, but an exchange of services between the user of the provider terminal 10 and the operator of the content delivery network CDN to which the ingest node 11 belongs.

In a second specific embodiment of the development, the piece of provider equipment 10 and the piece of control equipment 12 exchange data for awarding compensation for the transmission of the item of content in a step E3. These data are, for example, bank details of the user of the piece of provider equipment 10 and of an operator of the content delivery network CDN, a customer identifier for the user of the piece of provider equipment allowing the operator of the content delivery network CDN to charge the amount of the content transmission service on a telephone bill of the user of the piece of provider equipment or an identifier of the piece of provider equipment 10 such as an IMEI number or a MAC address. It goes without saying that other means of generating the compensation, such as those specified hereinabove, can be considered within the scope of the present solution.

In a step E4, the piece of provider equipment 10 transmits the item of content to the ingest node 11.

In a first implementation, the piece of provider equipment 10 generates at least one data stream containing constituent data packets of the item of content, data packets carrying data for awarding compensation for the transmission of the item of content and data packets carrying a value of one or more expected telemetry data items intended to be used by the piece of control equipment 12 to verify that the conditions for triggering the compensation are met. The data packets carrying a value of one or more expected telemetry data items are progressively inserted into the generated data stream.

In a second implementation, the piece of provider equipment 10 generates a first data stream containing the constituent data packets of the item of content, a second data stream containing the data carrying a value of one or more expected telemetry data items, and in the event that they were not transmitted in step E2, a third data stream containing the data for awarding compensation for the transmission of the item of content. These three data streams are then multiplexed in view of the transmission thereof to the ingest node 11. According to one example, each of these three data streams can take the form of a QUIC (Quick UDP Internet Connections) compliant stream, currently being standardized by the IETF (Internet Engineering Task Force), which are then multiplexed.

In a third implementation, the piece of provider equipment 10 generates a first data stream containing the constituent data packets of the item of content, and a second signal data stream carrying the data carrying a value of one or more expected telemetry data, items and in the event that they were not transmitted in step E2, data containing the data for awarding compensation for the transmission of the item of content. According to one example, such constituent data packets of the signal data stream are, for example, TLS clientHello and ServerHello type data packets defined in the QUIC protocol.

Finally, in a fourth implementation, the piece of provider equipment 10 generates a data stream containing constituent groups of pictures (GoP) of the compressed item of content, and a second signal data stream which carries the data packets carrying a value of one or more expected telemetry data items measuring the safe receipt of the first picture of the group of pictures, and in the event that they were not transmitted in step E2, data packets containing the data for awarding compensation for the transmission of the item of content. Such constituent data packets of the signal data stream are, for example, TLS clientHello and ServerHello type data packets defined as CHO and SHO in the QUIC protocol. In this fourth implementation, the compensation is triggered only when a group of packets constituting the first picture of the group of pictures is received by the ingest node 11 without loss or retransmission.

In step E5, the piece of provider equipment 10 transmits the one or more data streams generated according to one of the implementations of step E4, to the ingest node 11. In this embodiment, the transmitted data stream is intercepted by the piece of control equipment 12, which then transmits it to the ingest node 11.

In a step E5', the piece of provider equipment 10 transmits the one or more data streams generated according to one of the implementations of step E4, to the ingest node 11. In this embodiment, the transmitted data stream is received by the ingest node 11 which thus transmits the data packets carrying a value of one or more expected telemetry data items and the data packets containing data for awarding compensation for the transmission of the item of content to the piece of control equipment 12.

In a step E6, the piece of control equipment 12 verifies the compliance of the actual transmission conditions of the item of content with the expected transmission conditions of the item content negotiated in step E2.

Thus, in a first example implementation, when one of the telemetry data items used is a transit duration of a constituent data packet of the item of content, the piece of control equipment 12 determines a wandering time representative of a difference between an actual transit duration of the data packet in question, and an expected transit duration negotiated in step E2.

When the piece of control equipment 12 determines that the value of the wandering time is less than the threshold negotiated between the piece of provider equipment and the piece of control equipment 12 in step E2, the actual transit duration and the expected transit duration match. The actual transmission conditions are thus considered to comply with the expected transmission conditions.

In a second example implementation, when one of the telemetry data items is a transmission time of the data packet of the item of content, the piece of control equipment 12 measures a difference between an actual transit time of a constituent data packet of the item of content through an intermediate node 13-15, and an expected transit time of a constituent data packet of the item of content through an intermediate node 13-15. When the difference thus determined is less than the threshold negotiated between the piece of provider equipment and the piece of control equipment 12, the actual transit time and the expected transit time match. The actual transmission conditions are thus considered to comply with the expected transmission conditions.

In a third example implementation, when one of the telemetry data items is an identifier of at least one intermediate node 13-15 through which a constituent data packet of the item of content must transit during the transmission thereof to the ingest node 11, the piece of control equipment 12 verifies the presence of data packets inserted into the item of content by at least one of the intermediate nodes 13-15 and that include an identifier of the intermediate node 13-15. If such an identifier of the intermediate node 13-15 is present, then the actual transmission conditions are considered to comply with the expected transmission conditions.

The intermediate nodes 13-15 can also insert timing information such as, for example, transit times, throughput times, or processing times for a previous sequence of data packets, etc., into the data packets they insert into the item of content in order to allow the piece of control equipment 12 to verify compliance with other transmission conditions.

In a fourth example, when one of the telemetry data items is the cryptographic key created by the content delivery application from the set of transmission conditions selected in the negotiation step E2, the piece of control equipment 12 determines an "actual" cryptographic key from the actual telemetry data. If the "actual" cryptographic key thus obtained matches the cryptographic key created by the content delivery application, then the actual transmission conditions are considered to comply with the expected transmission conditions.

The four implementation examples described hereinabove can be implemented together.

Once the actual transmission conditions are considered to comply with the expected transmission conditions, the piece of control equipment 12 triggers the compensation for the ingestion of the data content in a step E7.

In a step E8, the piece of control equipment 12 issues an acknowledgment message ACK to the piece of provider equipment 10 indicating that the content has been ingested in accordance with the expected transmission conditions. This can take the form of a payment receipt establishing completion of the payment transaction, or a short message such as an SMS indicating that the requested service has been rendered and that the corresponding compensation has been awarded.

In the event that the actual transmission conditions are considered to not comply with the expected transmission conditions, the piece of control equipment 12 does not trigger the compensation for the ingestion of the data content. The piece of control equipment 12 thus sends, in a step E9, a failure message NACK to the piece of provider equipment 10 indicating that although the content has been ingested by the ingest node 11, this ingestion did not take place in accordance with the expected transmission conditions.

In such a case, either the compensation is not triggered and the operator of the content delivery network CDN does not receive any compensation for this ingestion, or the operator of the content delivery network CDN nonetheless receives lower compensation for this ingestion. Such lower compensation can be a remuneration that is lower than the maximum remuneration that can be received when all transmission conditions are met, or the performance of a lesser service by the piece of provider equipment 10, for example the latter can store a lower volume of data.

Such a failure message NACK is a short message such as an SMS indicating that the content has been ingested but that the expected transmission conditions were not fully met, and thus the corresponding compensation will not be awarded at the maximum expected level. The failure message NACK can further comprise an invitation to ingest the item of content again with the expected transmission conditions or new expected transmission conditions.

Figure 2:
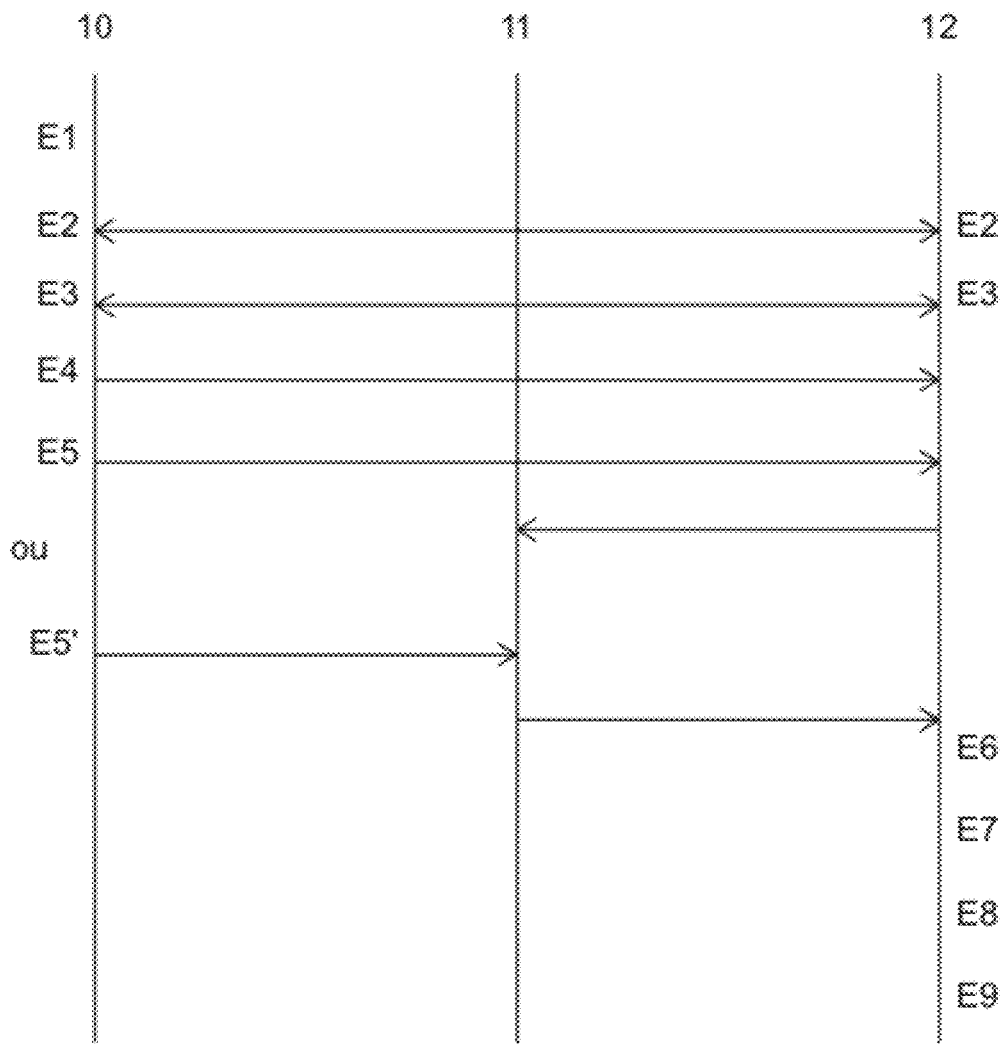
Figure 3:
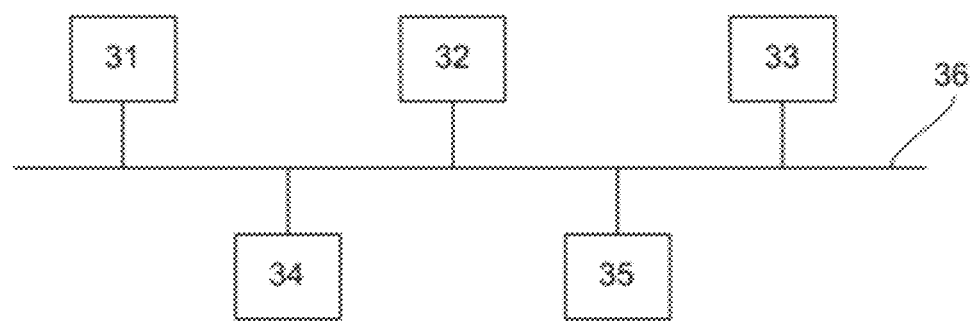

FIG. 3 shows a piece of provider equipment 10 according to one embodiment of the development. Such a piece of provider equipment 10 is capable of implementing the various embodiments of the methods for controlling the quality of the transmission of at least one item of content and for transmitting at least one item of content according to FIG. 2.

A piece of provider equipment 10 can comprise at least one hardware processor 31, a storage unit 32, an input device 33, a display device 34, and at least one network interface 35 which are connected to one another via a bus 36. It goes without saying that the component elements of the terminal 10 can be connected by means of a connection that is different from a bus.

The processor 31 controls the operations of the piece of provider equipment 10. The storage unit 32 stores at least one program for implementing the method according to one embodiment of the development to be executed by the processor 31, and various data, such as parameters used for computations carried out by the processor 31, and intermediate data for computations carried out by the processor 31, etc. The processor 31 can be formed by any known and suitable hardware or software, or by a combination of hardware and software. For example, the processor 31 can be formed by dedicated hardware such as a processing circuit, or by a programmable processing unit such as a central processing unit that executes a program stored in a memory thereof.

The storage unit 32 can be formed by any suitable means capable of storing the one or more programs and data in a computer-readable manner. Examples of a storage unit 32 include computer-readable non-transitory storage media such as solid-state memory devices and magnetic, optical or magneto-optical recording media loaded on a read/write unit.

The input device 33 can be formed by a keyboard, or a pointing device such as a mouse to be used by a user to enter commands. The display device 34 can also be formed by a display module, such as a graphical user interface or GUI.

The network interface 35 provides a connection between the piece of provider equipment 10 and the intermediate nodes 13-15 or the piece of control equipment 12 or the ingest node 11.

Figure 4:
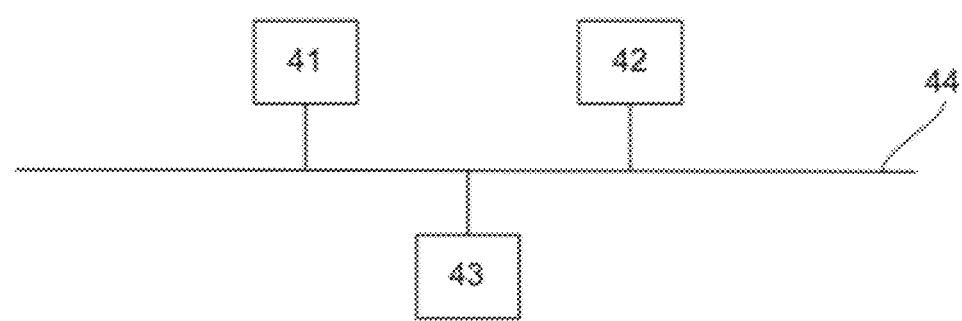

FIG. 4 shows a piece of control equipment 12 capable of implementing the various embodiments of the methods for controlling the quality of the transmission of at least one item of content and for transmitting at least one item of content according to FIG. 2.

A piece of control equipment 12 can comprise at least one hardware processor 41, a storage unit 42, and at least one network interface 43 which are connected to one another via a bus 44. It goes without saying that the component elements of the piece of control equipment 12 can be connected by means of a connection that is different from a bus.

The processor 41 controls the operations of the piece of control equipment 12. The storage unit 42 stores at least one program for implementing the method according to one embodiment to be executed by the processor 41, and various data, such as parameters used for computations carried out by the processor 41, and intermediate data for computations carried out by the processor 41, etc. The processor 41 can be formed by any known and suitable hardware or software, or by a combination of hardware and software. For example, the processor 41 can be formed by dedicated hardware such as a processing circuit, or by a programmable processing unit such as a central processing unit that executes a program stored in a memory thereof.

The storage unit 42 can be formed by any suitable means capable of storing the one or more programs and data in a computer-readable manner. Examples of a storage unit 42 include computer-readable non-transitory storage media such as solid-state memory devices and magnetic, optical or magneto-optical recording media loaded on a read/write unit.

At least one network interface 43 provides a connection between the piece of control equipment 12 and the intermediate nodes 13-15, and between the piece of control equipment 12 and the ingest node 11.

The invention claimed is:

1. A method of controlling a transmission of at least one item of content from a piece of provider equipment to an ingest node of a content delivery network, wherein the method comprises the following, which are implemented by a piece of control equipment:
   measuring a value of at least one actual telemetry datum relating to the transmission of at least one constituent data packet of the item of content;
   comparing the value of at least one actual telemetry datum with a value of at least one expected telemetry datum relating to the transmission of the at least one constituent data packet of the item of content; and
   when the value of the actual telemetry datum and the value of the expected telemetry datum match, triggering, for an entity managing the content delivery network, compensation for the transmission of the item of content.

2. The method of controlling the transmission of at least one item of content according to claim 1, comprising a prior negotiation between the piece of control equipment and the piece of provider equipment during which the one value of at least one expected telemetry datum is determined.

3. The method of controlling the transmission of at least one item of content according to claim 2, wherein, during the negotiation, the piece of control equipment and the piece of provider equipment further exchange data on a type of compensation for the awarding of the compensation in exchange for the transmission of the item of content.

4. The method of controlling the transmission of at least one item of content according to claim 1, wherein the at least one telemetry datum belongs to a group that includes:
   a duration of transit between the piece of provider equipment and the ingest node of a constituent data packet of the item of content,
   an identifier of at least one intermediate node contributing to routing a constituent data packet of the item of content between the piece of provider equipment and the ingest node, the identifier being able to contain the identifier of an operator managing the intermediate node,
   a transit time of a constituent data packet of the item of content through an intermediate node, corresponding to a time when the intermediate node receives, processes or transmits the data packet,
   a delay for the crossing of an intermediate node by a constituent data packet of the item of content,
   a delay for the processing of a constituent data packet of the item of content by an intermediate node,
   a quality of service, representative of the prioritization of the constituent data packet of the item of content, which quality of service is represented by a qualitative indication of the processing of the packet during the routing thereof to the ingest node,
   a cryptographic key created from a transmission condition,
   a receipt without loss or retransmission of a group of constituent data packets of the item of content, and
   a combination of the individual telemetry data of the group.

5. The method of controlling the transmission of at least one item of content according to claim 4, wherein, when the telemetry datum is a duration of transit via an intermediate node routing the at least one constituent data packet of the item of content, the comparing consists of determining a wandering time, and when a value of the wandering time is lower than a threshold negotiated between the piece of provider equipment and the piece of control equipment, the actual transit duration and the expected transit duration match.

6. The method of controlling the transmission of at least one item of content according to claim 4, wherein when the telemetry datum is a transmission time for the constituent data packet of the item of content, the comparing consists of determining a difference between an actual transmission time for the at least one constituent data packet of the item of content, and an expected transmission time for the at least one data packet, and when the difference is lower than a threshold negotiated between the piece of provider equipment and the piece of control equipment, the actual transmission time and the expected transmission time match.

7. The method of controlling the transmission of at least one item of content according to claim 4, wherein when the telemetry datum is an identifier of at least one intermediate node through which the constituent data packet of the item of content must transit during the transmission thereof to the ingest node, the comparing consists of verifying the presence of at least one datum inserted into the item of content by the at least one intermediate node and containing the identifier of the at least one intermediate node.

8. A method of transmitting at least one item of content from a piece of provider equipment to an ingest node of a content delivery network, wherein the method comprises the following, which are implemented by the piece of provider equipment:
   negotiating between the piece of provider equipment and a piece of equipment for controlling the transmission of the item of content during which a value of at least one expected telemetry datum is determined, the value of at least one expected telemetry datum allowing the piece of control equipment to control the transmission of the item of content;
   generating at least one data stream containing at least one data packet containing constituent data of the item of content and/or data containing the value of at least one expected telemetry datum; and
   transmitting the data stream thus generated to the ingest node.

9. The method of transmitting at least one item of content according to claim 8, wherein, during the negotiation, the piece of provider equipment and the piece of control equipment further exchange data on a type of compensation for the awarding, to the content delivery network, of compensation in exchange for the transmission of the at least one item of content.

10. The method of transmitting at least one item of content according to claim 8, wherein the at least one telemetry datum belongs to a group that includes:

a duration of transit between the piece of provider equipment and the ingest node of a constituent data packet of the item of content, an identifier of at least one intermediate node contributing to routing a constituent data packet of the item of content between the piece of provider equipment and the ingest node, the identifier advantageously being able to contain the identifier of an operator managing the intermediate node, a transit time of a constituent data packet of the item of content through an intermediate node, corresponding to a time when the intermediate node receives, processes or transmits the data packet, a delay for the crossing of an intermediate node by a constituent data packet of the item of content, a delay for the processing of a constituent data packet of the item of content by an intermediate node, a quality of service, representative of the prioritization of the constituent data packet of the item of content, which quality of service can, according to one example, be represented by a qualitative indication of the processing of the packet during the routing thereof to the ingest node, a cryptographic key created from a transmission condition, a receipt without loss or retransmission of a group of constituent data packets of the item of content, and a combination of the individual telemetry data of the group.

11. The method of transmitting at least one item of content according to claim 8, wherein the piece of provider equipment generates a first data stream containing the constituent data packets of the item of content and at least a second data stream containing the data packets carrying the value of at least one expected telemetry datum, the first and second data streams being multiplexed into a data stream transmitted to the ingest node.

12. The method of transmitting at least one item of content according to claim 8, wherein the data packets carrying the value of at least one expected telemetry datum are transmitted in the form of signal data packets.

13. An equipment for controlling the transmission of at least one item of content from a piece of provider equipment to an ingest node of a content delivery network, wherein the control equipment comprises means for:

measuring a value of at least one actual telemetry datum relating to the transmission of at least one constituent data packet of the item of content;

comparing the value of at least one actual telemetry datum with a value of at least one expected telemetry datum relating to the transmission of the at least one constituent data packet of the item of content; and when the value of the actual telemetry datum and the value of the expected telemetry datum correspond, triggering, to the benefit of the content delivery network, compensation for the transmission of the item of content.

14. An equipment capable of transmitting at least one item of content to an ingest node of a content delivery network, wherein the equipment comprises means for:

negotiating with a piece of equipment for controlling the transmission of the item of content during which a value of at least one expected telemetry datum is determined, the value of at least one expected telemetry datum allowing the piece of control equipment to control the transmission of the item of content;

generating at least one data stream containing at least one data packet containing constituent data of the item of content and/or data containing the value of at least one expected telemetry datum; and transmitting the data stream thus generated to the ingest node.

15. A non-transitory computer storage medium storing program code instructions of a computer program for implementing the method for controlling the transmission of at least one item of content according to claim 1, when the computer program is executed by a processor.

16. A non-transitory computer storage medium storing program code instructions of a computer program for implementing the method for transmitting at least one item of content from a piece of provider equipment to an ingest node according to claim 8, when the computer program is executed by a processor.

\* \* \* \* \*